May 19, 1936.　　　L. C. HUCK　　　2,040,939
METHOD OF MAKING RIVETS
Original Filed Dec. 1, 1931
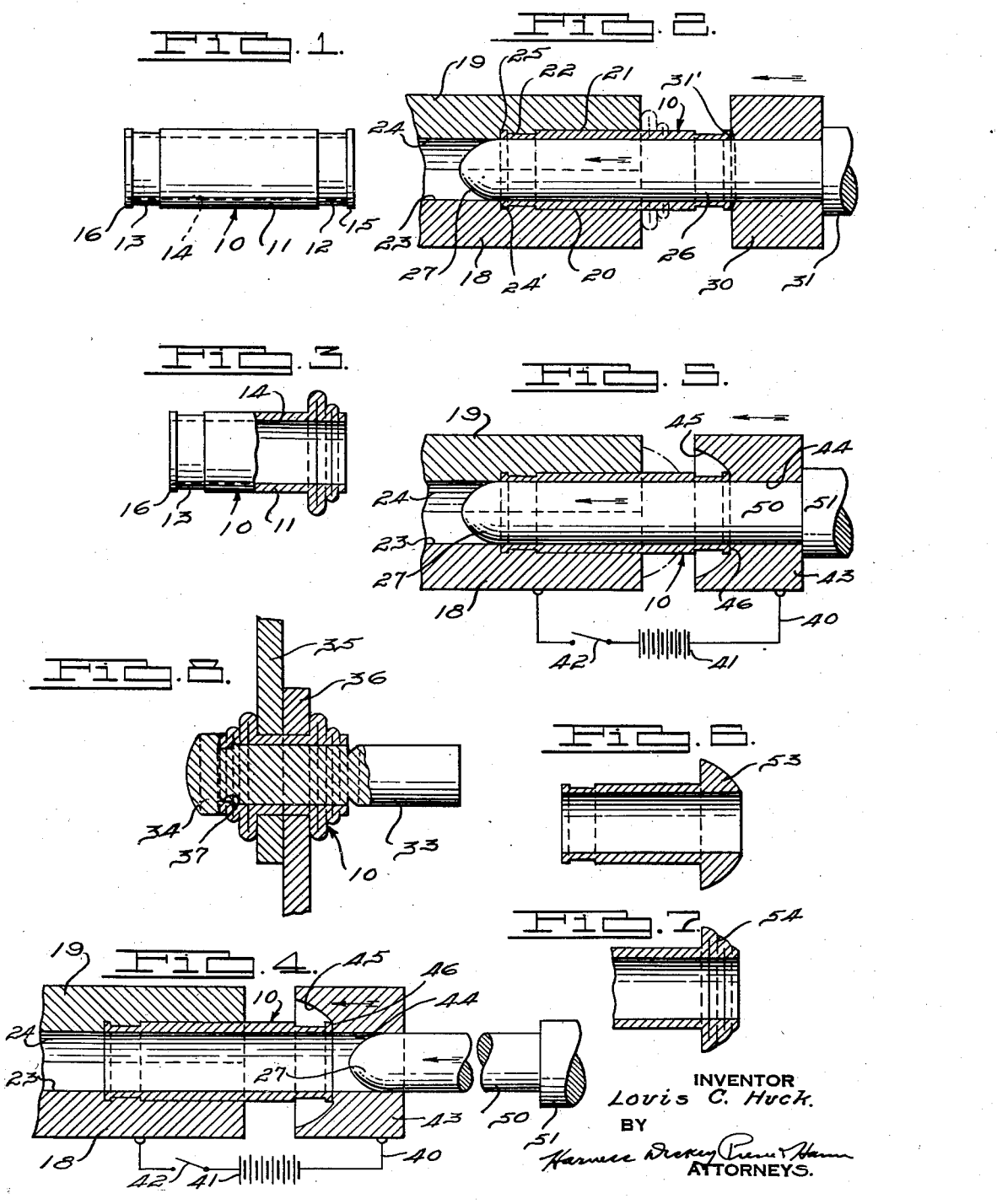
INVENTOR
Louis C. Huck.
BY
ATTORNEYS.

Patented May 19, 1936

2,040,939

UNITED STATES PATENT OFFICE 2,040,939

METHOD OF MAKING RIVETS

Louis C. Huck, Buchanan, Mich., assignor to Huxon Holding Corporation, Detroit, Mich., a corporation of Michigan Application December 1, 1931, Serial No. 578,314
Renewed October 19, 1935

2 Claims. (Cl. 10—27)

The invention relates to devices for securing structural elements together and it has particular relation to a rivet and a method of making it.

In certain respects the invention is similar to and constitutes an improvement over those embodied in my co-pending application for patent, Serial Number 545,004, filed June 17, 1931, and the co-pending application for patent of R. A. Miller, Serial Number 559,826, filed August 28, 1931, both of which applications relate to rivets.

It may be mentioned in general, that the type of rivet involved comprises a tubular female member adapted to extend through aligned openings in structural elements, such as plates to be riveted, and a male or shank member extending through the female member. The male or shank member is provided with a head at one end which engages one end of the female member and the diameter of such head and the end portion of the female member with which it cooperates, is such that as assembled, such end of the female member and head on the male member, can be inserted through the openings in the structural elements. Then by holding the female member substantially stationary with respect to the structural elements and pulling the male member through it in such direction that the head on the former is urged against the adjacent end of the latter, the end portion of the female member adjacent the head on the male member is buckled against the structural element or plate adjacent thereto, it being understood that the reactionary force of such pull will be applied against the opposite end of the female member. In my co-pending application, that end of the female member opposite the end engaging the head on the male member, may either have a head which is initially formed during manufacture of the female member, or else it may be buckled against the structural elements adjacent thereto at the same time that the head on the male member buckles the opposite end of the female member. Suitable machinery used to hold the female member in place when the male member is pulled therethrough may at the same time be adapted to buckle said end of the female member opposite the end buckled by the head on the male member by applying the reactionary force of the pull to buckle the first mentioned end of the female member. Hence both ends of the female member might be buckled substantially simultaneously.

The principal objects of the present invention are to provide an economical and efficient method of manufacturing the female member of a rivet of the type generally discussed above, and particularly forming a head on one end of the member prior to utilizing it for riveting structural elements; to provide a method of forming a head on a tubular female rivet member of the type described, by means of which deformation or upsetting of the metal is substantially limited to that metal from which the head is formed; to provide a method of manufacturing a tubular, female rivet member with a head, which includes heating only substantially the metal from which the head is to be formed, in order to facilitate making the head and prevent undesirable stresses in the remainder of the member during such operation; to provide an apparatus for forming the head on the member, in a quick and accurate manner, which preserves the shape of the remainder of the member; to provide an apparatus of this character by means of which the metal from which the head is formed, may be heated so as to facilitate shaping the head; and to provide a rivet member of simple construction, which may be manufactured and applied inexpensively.

For a better understanding of the invention reference may be had to the accompanying drawing forming a part of the specification wherein—

Fig. 1 is a side view of a female rivet member constructed according to one form of the invention, prior to forming a head at either or both ends thereof;

Fig. 2 illustrates the manner of initially forming a head at one end of the female member shown by Fig. 1, without heating the metal;

Fig. 3 illustrates the female member after a head has been formed on one end thereof in the manner shown by Fig. 2;

Fig. 4 relates to the forming of the head on the female member, by heating the metal, and illustrates the manner in which the metal at one end of the female member may be heated prior to forming the head;

Fig. 5 is similar to Fig. 4 and illustrates the manner of forming the head after the metal at one end of the female member has been heated;

Fig. 6 illustrates the female member having a head formed in the manner illustrated by Figs. 4 and 5, wherein the metal has been so heated that the metal in the head is substantially integrally associated in a solid mass;

Fig. 7 illustrates a female member having a head which may be formed in the manner shown by Figs. 4 and 5, but wherein the metal is not heated sufficiently to form the head into an integral and solid mass;

Fig. 8 in general illustrates the manner of utilizing the rivet constructed according to one form of the invention, for securing structural elements together.

Referring to Fig. 1, the female rivet member, before a head is formed thereon, is indicated at 10, and has a central cylindrical body portion 11, and reduced cylindrical portions 12 and 13 at opposite ends of the central portion. The longitudinally extending opening in the female member indicated at 14, is of substantially the same diameter throughout the length of the member and from this it follows that the reduced end portions 12 and 13 have thinner walls than the central portion 11. At the remote ends of the member, and hence at the remote ends of the end portions 12 and 13, annular flanges 15 and 16 are provided which have inner and outer diameters substantially equal to the inner and outer diameter of the central portion 11. From this it will be apparent that the female member has weaker portions at the ends of the central body portion 11 and that if it is desired to buckle the end portions of the member by applying pressure thereto, the flanges 15 and 16 will serve as relatively large abutments to facilitate buckling and proper application of the pressure. Preferably before using the rivet, a head is formed on one end of the female member, and one method and apparatus for forming such head will now be described. While it has been indicated that opposite ends of the female member are alike, it, of course, should be understood that the shape of one end may be different from that of the other. In other words, opposite ends of the female member need not be symmetrical, although it is preferred to have them symmetrical.

Referring to Fig. 2, a pair of holding blocks 18 and 19 are provided, constructed preferably from metal, which have complementary openings 20 and 21 therein respectively, adapted to embrace the sides of the female member. When the latter is disposed between such blocks and in the openings 20 and 21, one end of the member projects beyond the ends of the blocks and such projecting end includes a substantial part of the body 11. For the purpose of holding the female member against longitudinal movement and properly supporting it, the blocks are provided with complementary inwardly directed walls 22 adapted to fit around and in the reduced end portion of the female member between the blocks, and openings 23 and 24 inwardly of the wall 22, which are of substantially the same diameter as the inner diameter of the female member, to provide a shoulder 24' for the flange at the inner end of the female member. To accommodate this flange it will be noted that the reduced openings 23 and 24 are slightly spaced from the wall 22 to provide a groove 25 complementary to the flange. The holding blocks 18 and 19 may be secured together in any suitable manner such as by bolts, clamps and the like to hold the female member in position between them.

In forming the projecting end portion of the female member into a head, a pin 26 preferably composed of metal and substantially equal in outer diameter to the inner diameter of the member, is inserted thereinto from the projecting end of the member and this pin serves as a support for the inner surface of the member during the head forming operation. The inner end of the pin 26 is rounded as indicated at 27 to facilitate proper entry of the pin into the female member without danger of damaging it. Preferably the pin slidably projects through a die member 30 also preferably constructed of metal and beyond the latter, is provided with an enlarged portion 31, which arrangement permits inserting the pin properly into the female member and then upon continued movement of the pin, the enlarged portion 31 thereof carries the die member 30 against the end of the female member projecting beyond the holding blocks 18 and 19. In the construction shown by Fig. 2, however, the pin may be rigid or otherwise secured to the die 30, if this should be found desirable. The die member preferably has its face adjacent the holding members 18 and 19, provided with a narrow, annular surface around the opening for the pin 26, which is undercut slightly at an angle of about five degrees, as indicated at 31'. Hence in moving the die member against the flange on the outer end of the female rivet member, the outside corner edge of the latter will be the first part of the rivet member to engage the die member. This type of engagement is advantageous in properly forming the head on the female member.

As the pin and die 30 are moved toward the holding blocks, with the pin projecting into the female member and supporting the wall thereof, it is manifest that the die 30 as it exerts pressure against the end flange on the projecting portion of the female member will cause buckling first of the weaker portion of reduced diameter, at the end of the female member. After the weaker portion mentioned is buckled, continued movement of the die 30 will cause buckling of that part of the body 11 projecting beyond the ends of the holding blocks and finally the female member will be provided with a head substantially as shown by Fig. 3, which includes two buckled portions, the one largely comprising the weaker or reduced portion of the female member, and the other the buckled end body portion. Following removal of the pin 26 and separation of the holding members 18 and 19, the female member as removed has a shape similar to that shown by Fig. 3.

It should be understood that a single head instead of a double head may be formed and that the female member may be shaped initially to secure this result. For example, by omitting the reduced end portion 12, or making it substantially the same as the central body part of the female member, a single head may be formed by the processes described. However, ordinarily a double head is preferred because it ordinarily may be formed more symmetrically than the single head.

In using the die member 30 with the tapered surface 31', the force of the head when applied to the end of the female member will be directed against the outer peripheral portion of the end face of the member first, and it has been determined that this is desirable either in forming a single head or double head, for properly forming a head.

When a rivet member of this character is applied to a structure to be riveted, a male member 33 shown by Fig. 8, is inserted through the female member and such male member has a head 34 which engages that end of the female member which has not been buckled. The outer diameter of the head 34 is substantially equal to the outer diameter of the flange at this end of the female member, and hence the outer diameter of the body portion 11, and as thus assembled the female and male members may be inserted through openings in a pair of plates 35 and 36 to be riveted. Adjacent its head, the body of the male member is provided with a groove or undercut portion 37 of reduced diameter and the purpose of this will presently be set forth. Now in applying the rivet, if the newly formed head, shown by Fig. 3, is held against the adjacent plate 36 shown by Fig. 8, and the projecting end portion of the male member, is pulled through the structure, the head 34 will exert a compressive force against the unbuckled and projecting portion of the female member and as this pull is continued, the head will first cause buckling of the weaker end portion of the female member and then buckling of the projecting part of the body portion. As the head 34 is so moved against the end flange of the female member, the metal in and adjacent such flange will be compressed and flowed into the groove 37, thereby locking the end of the male member to the female member. After the head 34 on the male member has buckled the female member as shown by Fig. 8, the opposite and projecting end of such male member is cut off at the end of the female member to provide a substantially smooth rivet head. If desired, however, the male member may have an undercut as shown by Fig. 8 to break at a desired pull and so located as to have the break occur substantially flush with the head of the female member.

Attention is directed to the fact that in cold forming the head on the female rivet member, the metal is deformed in such manner that it could be very satisfactorily shaped, even if a wide variety of metals were used, whereas forming an ordinary type of rivet head when the metal is cold, would be difficult except when certain metals are used. In other words, in the rivet described, many different metals could be used, and heads formed from the metal while cold, whereas in forming a head of the ordinary rivet type, certain of these metals would not lend themselves readily to cold forming processes.

In forming the head on the female member according to another method, the end of the member from which the head is formed is heated by any suitable heating device, although the use of an electric current for this purpose is preferred as illustrated in Figs. 4 and 5. It will be noted that the same holding blocks 18 and 19 may be used, as long as they are electrically conductive. For heating the projecting end of the female member, an electric circuit 40 is utilized, including a source of electrical energy 41 and a make and break switch 42. One terminal of the circuit is connected to the holding blocks 18 and 19 while the other terminal is connected to a die member 43 having a central aperture 44 substantially equal in diameter to the inner diameter of the female member, and a recessed head face 45 adapted to form the head on the female member. The major portion of this recess is of concave character, but adjacent the central opening 44, an annular shoulder 46, radially disposed with respect to the axis of the opening 44, is provided which abuts the end flange on that part of the female member projecting beyond the ends of the holding blocks. One advantage of the shoulder 46, is that greater contact area will be had between the die member 43 and the end of the female member, and hence a more satisfactory electrical connection between such parts will be obtained. When the switch 42 is closed, it is apparent that an electric current will flow through the projecting end of the female member, and that such part of the female member will offer the greatest resistance to the flow of such current. Preferably the holding blocks 18 and 19 and the die member 43 will be composed of some metal having small resistance to the flow of an electric current, to prevent undesirable heating of such parts, during the time that the projecting part of the female member is being heated. The opening 44 in the die member 43 is adapted to receive a pin 50 slidably disposed in the opening, and such pin is substantially identical to the pin 26 shown by Fig. 2, and is provided with an enlarged portion 51 adapted to engage the die member 43 after the pin has been moved into the opening 44 and into the female member.

In forming the head on the female member, it is apparent that the reduced portion will heat more quickly, and if desired, when this part has been heated sufficiently, the current may be turned off and then the first head may be formed by pushing the pin and die member 43 as described previously. Then the pin may be withdrawn and the projecting body portion of the female member may be heated to the desired extent, the current then turned off and then the second head formed by moving the pin and head 43 inwardly.

By initially forming the first head from the reduced portion, the resistance of this part of the member, will be diminished and consequently any danger of overheating such part, when the projecting body portion is heated, can thereby be avoided.

The electric current passing through the projecting part of the female member may be utilized to such extent that the metal therein is heated to welding heat and hence when the head is formed on the female member, it will be composed of integral metal solid in character, or the end of the female member may be so heated that the head formed will be merely buckled, although it should be apparent that various degrees of heat may be used from a heat merely instrumental to facilitate forming of the head, to a heat sufficient to cause welding of the metal into a solid mass. After the metal has been heated to the temperature desired, the pin 50 is pushed through the opening 44 in the die member 43, and into the female member, to the end thereof located between the holding members 18 and 19, in the manner shown in Fig. 5, and then upon further movement of the pin the enlarged portion 51 will cause the die 43 to move against the projecting end of the female member. As the die member 43 moves, the thinner end of the female member will first buckle, and then upon further movement, the projecting end part of the body of the female member will be buckled, and if the metal in the female member has been heated sufficiently, the buckling parts will weld into a solid and integral mass forming a head as shown at 53 in Fig. 6. It is apparent that the pin 50 during such forming operation will support the inner surface of the female member and maintain its cylindrical contour, thereby insuring formation of the head in the manner desired. If the metal is not heated to such point that welding of the metal into an integral solid mass occurs, the head may be buckled in the manner indicated at 54 in Fig. 7. In either event the concave recess 45 in the head member 43 will round the head as shown in both Figs. 6 and 7, and either cause welding of the metal into an integral solid mass, or an ironing of the metal into rounded head form. After the head is thus formed on the female member, it may be applied for the purpose of riveting structural elements together in the manner previously described in connection with Fig. 8.

While the pin 50 may be composed of metal in the processes previously described, it is to be understood that it may be composed of some suitable electrically non-conductive material and in this event the first head may be formed when heated sufficiently, and then the second head formed, without turning off the electric current or withdrawing the pin at any time during the process. In this manner difficulties arising as a result of the different electrical resistances of the two parts of the end portion of the female member may easily be avoided.

From the foregoing description it is apparent that new and useful methods of manufacturing rivets have been set forth, which simplifies both the manufacture and application of the rivets. Moreover, novel and useful apparatus is set forth to facilitate manufacture of the rivet, and particularly the forming of the head thereon in an accurate manner. In general, the invention provides improvements in rivets of the character discussed, and improvements in the methods and apparatus for making them, all of which increase the general utility of rivets of this character.

Although certain forms of the invention have been described and illustrated, it will be apparent to those skilled in the art that various modifications may be made without departing from the scope of the appended claims.

I claim:

1. The method of providing a head on a tubular rivet member, which comprises holding the member on a support so that one end projects therefrom, passing an electric current through such projecting end to heat it, inserting a supporting pin into the projecting end immediately after the heating operation, and then axially compressing the heated end to form a head.

2. The method of providing a head on a tubular member, which comprises holding the member on a support so that one end projects therefrom, passing an electric current through such projecting end to heat it, inserting a supporting pin into the projecting end of the member immediately after the heating operation, and then axially compressing the heated end to form a bulbed head defined by folded walls.

LOUIS C. HUCK.